(12) United States Patent
Vichinsky

(10) Patent No.: US 7,325,530 B2
(45) Date of Patent: Feb. 5, 2008

(54) ENGINE INTAKE MANIFOLD AND AIRFLOW CONTROL VALVE ASSEMBLY

(75) Inventor: Kevin Vichinsky, Portage, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 185 days.

(21) Appl. No.: 11/328,087

(22) Filed: Jan. 10, 2006

(65) Prior Publication Data

US 2006/0169247 A1    Aug. 3, 2006

Related U.S. Application Data

(60) Provisional application No. 60/642,668, filed on Jan. 11, 2005.

(51) Int. Cl.
*F02D 9/10* (2006.01)

(52) U.S. Cl. ............ 123/336; 123/184.34; 123/184.37; 123/184.42; 123/184.45; 123/184.47

(58) Field of Classification Search ................ 123/336, 123/184.34, 184.37, 184.42, 184.45, 184.47
See application file for complete search history.

(56) References Cited

U.S. PATENT DOCUMENTS 5,535,718 A * 7/1996 Nakai et al. ................ 123/336
5,957,108 A * 9/1999 Kato .......................... 123/336

* cited by examiner

*Primary Examiner*—Erick Solis
(74) *Attorney, Agent, or Firm*—Crowell & Moring LLP

(57) ABSTRACT

An engine intake manifold includes a casing having a plurality of air intake passages, and a plurality of valve plates, wherein each valve plate is disposed in one of the air intake passages to control airflow through the air intake passage. The valve plates are connected to a common valve shaft for rotation between an open position and a closed position. The engine intake manifold may further include an actuator that is mounted to the casing or to the valve shaft via a snap connection, and is rotationally connected to the valve shaft to allow the actuator to rotate the valve shaft.

33 Claims, 2 Drawing Sheets

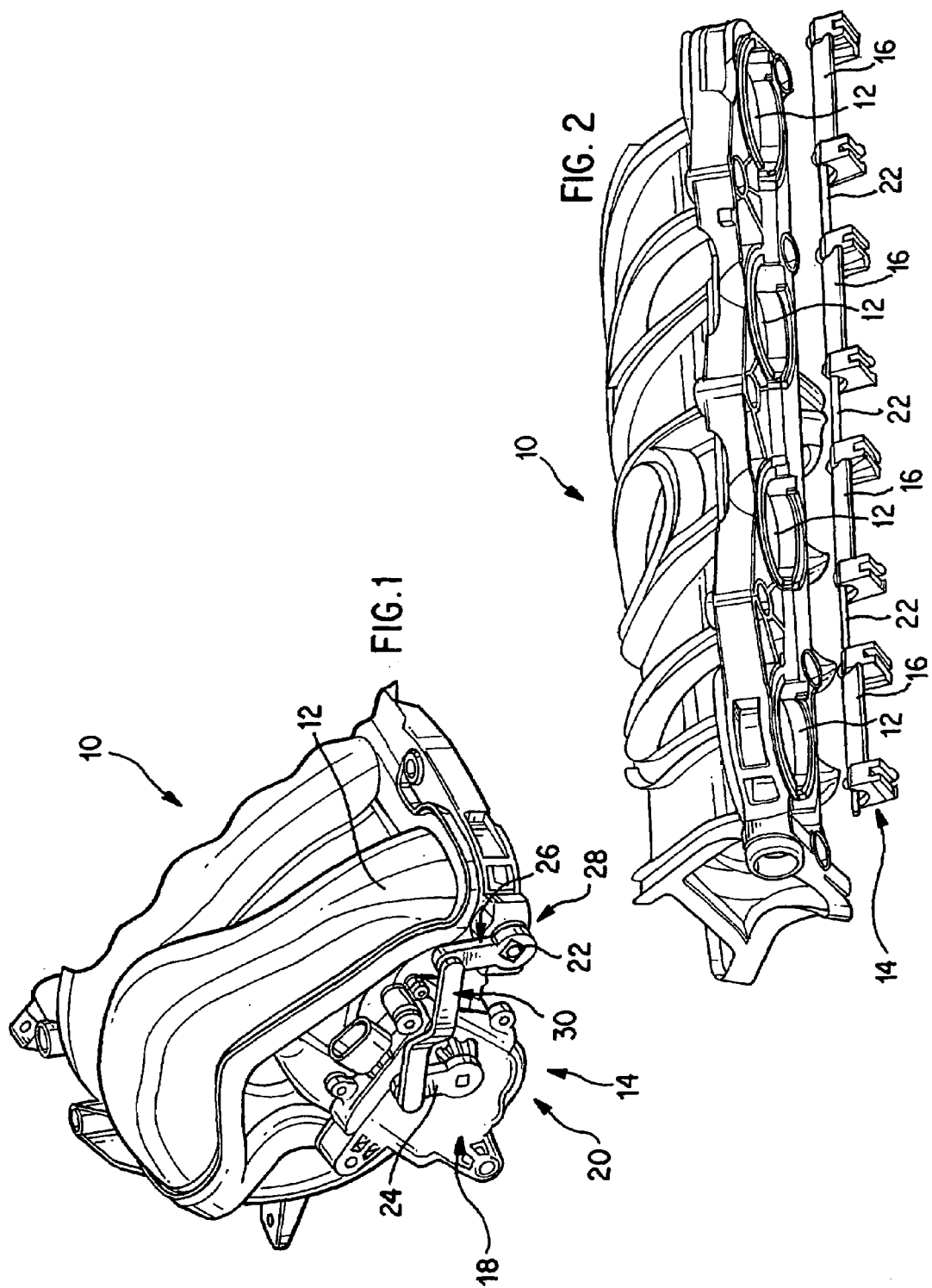

ENGINE INTAKE MANIFOLD AND AIRFLOW CONTROL VALVE ASSEMBLY

This application claims the benefit of U.S. Provisional Patent Application No. 60/642,668, filed Jan. 11, 2005, the entire disclosure of which is incorporated herein by reference.

FIELD OF THE INVENTION

The present invention relates to an intake manifold for an internal combustion engine and to an airflow control valve assembly for an engine intake manifold.

BACKGROUND OF THE INVENTION

The operation of a typical engine intake system is well known. In a typical internal combustion engine, air enters the engine's intake manifold through a throttle body. The throttle body generally has one throttle valve that regulates the amount of air entering the intake manifold. Once the air is inside the intake manifold, it flows through the intake manifold's air passages into the combustion chambers of the engine. In the intake manifold, the air mixes with fuel, and the air/fuel mixture is introduced into the combustion chambers of the engine for combustion.

How well the air and fuel is mixed directly affects engine performance in terms of efficiency and emission, and is affected by how the air flows through the intake manifold. Therefore, the air passages of the intake manifold are configured to achieve a thorough mixing of the air and fuel and to enhance engine performance. However, different engine operating conditions, especially different engine speeds, require different air passage configurations for maximum engine performance. Therefore, the air passages of the intake manifold are often configured to achieve a balanced engine performance over the entire range of engine operation, but less than optimum engine performance at each engine operating condition.

For these reasons an airflow control valve assembly is provided to adjust the airflow through the intake manifold to account for different engine operating conditions, in particular to promote a thorough mixing of air and fuel at low engine speeds without sacrificing engine efficiency at high engine speeds.

Typically, the airflow control valve assembly has valve plates disposed, respectively, in the air passages of the intake manifold to adjust airflows through the air passages. The valve plates are mounted to a common valve shaft for rotation about the shaft's axis. An actuator, controlled by an electronic control unit, rotates the valve plates between an open position and a closed position depending on the engine operating condition.

The actuator, such as an electric motor, is mounted on the casing of the intake manifold with screws. Additionally, the actuator is rotationally connected to the valve shaft so that the actuator's rotational movement can be transmitted to the valve shaft. The actuator can be connected to the valve shaft either directly or indirectly via a mechanism, such as a gear arrangement or a four-bar linkage. The mechanism is also mounted to the casing of the intake manifold with screws, and is rotationally connected to the actuator and the valve shaft to transmit the actuator's rotational movement to the valve shaft.

SUMMARY OF THE INVENTION

In accordance with one aspect of the invention, an engine intake manifold includes a casing having a plurality of air intake passages, and a plurality of valve plates, wherein each valve plate is disposed in one of the air intake passages to control airflow through the air intake passage. The valve plates are connected to a common valve shaft for rotation between an open position and a closed position. The engine intake manifold may further include an actuator that is mounted to the casing via a snap connection and is rotationally connected to the valve shaft to allow the actuator to rotate the valve shaft. The snap connection has several advantages. For example, it eliminates the need for screws and makes it easier to assemble the intake manifold, resulting in cost reduction and increased efficiency.

In a preferred embodiment, the snap connection includes a sleeve on the casing of the intake manifold and a sleeve on the actuator, wherein the valve shaft is rotatably mounted in the casing sleeve for support. The outer surface of the casing sleeve may include one of an indentation and an protrusion, and the inner surface of the actuator sleeve may include the other of the indentation and the protrusion, wherein, when the casing sleeve extends into the actuator sleeve, the indentation and the protrusion engage with each other to form the snap connection.

In another preferred embodiment, the indentation is a circular groove and the protrusion is a circular protrusion, and the circular groove and the circular protrusion are configured so that, when they are engaged, they secure the casing sleeve inside the actuator sleeve to form a snap connection. Preferably, the circular protrusion and circular groove are sufficiently flexible so that the circular protrusion can be easily snapped into the circular groove. To that end, the actuator sleeve may include one or more axial grooves to increase the flexibility of the circular protrusion or the circular groove on the actuator sleeve's inner surface.

To rotationally connect the actuator to the valve shaft, an end of the valve shaft may include a polygonal member, and the actuator sleeve may include a polygonal indentation, wherein, when the end of the valve shaft extends into the actuator sleeve, the polygonal member engages the polygonal indentation to rotationally connect the actuator to the valve shaft.

In a further preferred embodiment of the invention, the actuator includes an actuator shaft and a four-bar linkage connecting the actuator shaft to the valve shaft. The four-bar linkage has a driving crank connected to the actuator shaft, a follower crank rotatably connected to the casing sleeve via the snap connection, and a coupler connecting the driving and follower cranks.

In accordance with another aspect of the invention, an airflow control valve assembly includes a plurality of valve plates, a valve shaft connected to the valve plates, an actuator, and a snap connection that connects the valve shaft to the actuator to allow the actuator to rotate the valve shaft. The valve plates are disposed, respectively, in the air intake passages of the engine intake manifold to control airflows through the air intake passages.

The snap connection may include a cavity and a member that can extend into the cavity. The cavity can be disposed at either a valve shaft end or the actuator, and the member can be disposed at the other of the valve shaft end and actuator. One of the cavity and member may include an indentation, and the other of the cavity and member may include a protrusion. When the member extends into the cavity, the protrusion can engage the indentation to secure the member inside the cavity and to rotationally connect the member and cavity to each other so that the actuator can rotate the valve shaft.

In a preferred embodiment of the invention, the member is an cylindrical end of the valve shaft, and the cavity is the hollow interior of a sleeve belonging to the actuator, wherein the cylindrical end of the valve shaft is extendable into the sleeve in the axial direction. Furthermore, the indentation of the preferred embodiment may be a circular groove, and the protrusion may be a circular protrusion. The circular protrusion and the circular groove preferably are sufficiently flexible so that the circular protrusion can be snapped into the circular groove. To increase the flexibility of the circular protrusion or the circular groove, the sleeve may include at least one axial groove intersecting the circular protrusion or the circular groove on the sleeve's inner surface. Similarly, the cylindrical end of the valve shaft can be made hollow and can also include at least one axial groove intersecting the circular protrusion or the circular groove.

In another preferred embodiment, the control valve assembly may include a four bar linkage that connects an actuator shaft to the valve shaft to allow the actuator to rotate the valve shaft. The four-bar linkage has a driving crank connected to the actuator shaft, a follower crank connected to the valve shaft via the snap connection, and a coupler connecting the driving and follower cranks. The four-bar linkage can be considered as a part of the actuator or as a part separate from the actuator.

In accordance with a further aspect of the invention, an engine intake manifold includes one or more air intake passages and an airflow control valve assembly as described above, wherein each valve plate of the airflow control valve assembly is disposed in one of the air intake passages to control airflow through the one air intake passage. The airflow control valve assembly of the intake manifold may have any one or more features described in connection with the second aspect of the invention.

BRIEF DESCRIPTION OF THE DRAWINGS

FIG. 1 is a perspective view of a preferred engine intake manifold of the present invention.

FIG. 2 is a perspective view of a preferred airflow control valve assembly of the present invention and a portion of the intake manifold which is designed to receive the airflow control valve assembly, where the airflow control valve assembly is shown separate from the intake manifold.

DETAILED DESCRIPTION OF PREFERRED EMBODIMENTS

Figure 3:
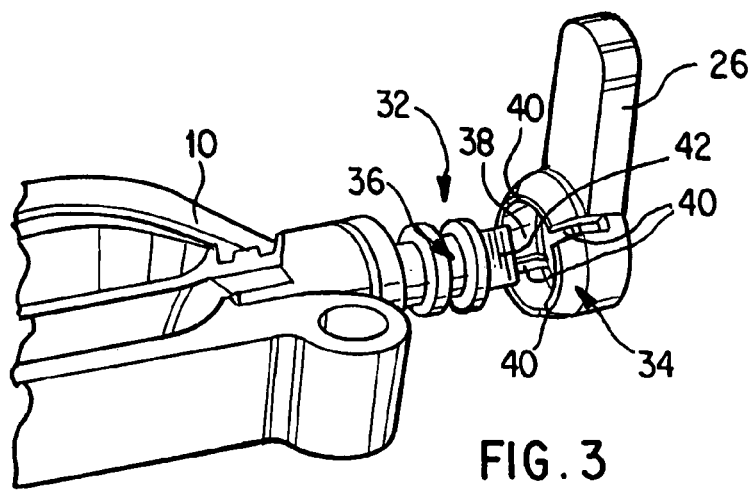
FIG. 3 is a perspective view of a preferred snap connection, in an unconnected state, which connects the valve shaft and actuator of the airflow control valve assembly.

FIGS. 1 and 2 illustrate a preferred engine intake manifold 10 of the present invention. The engine intake manifold 10 includes a plurality of air intake passages 12 and an airflow control valve assembly 14 that is used to control the airflows through the air intake passages 12. In FIG. 2, the airflow control valve assembly 14 is shown separate from a section of the intake manifold which is designed to receive the airflow control valve assembly 14. As shown in FIG. 2, the airflow control valve assembly 14 has a plurality of valve plates 16, and each valve plate 16 is disposed in an air intake passage 12 to control the airflow through the air intake passage 12. The airflow control valve assembly 14 also includes a valve shaft 22 connected to the valve plates 16 to rotate the valve plates 16 between an open position and a closed position.

Further, as shown in FIG. 1, the airflow control valve assembly 14 also includes an actuator 18 and a four-bar linkage 20 that is used to rotationally connect the actuator 18 to the valve shaft 22, allowing the actuator 18 to rotate the valve shaft 22 and plates 16 to adjust the position of the valve plates 16. The four-bar linkage 20 has three moveable parts: a driving crank 24 connected to and driven by the actuator 18, a follower crank 26 rotationally connected to the valve shaft 22 via a snap connection 28, and a coupler 30 connecting the driving and follower cranks 24, 26. Although the four-bar linkage 20 is considered as a part separate from the actuator 18 in this description, it can also be considered as a part of the actuator 18, as is defined in the claims.

As an alternative to the four-bar linkage 20, any suitable type of mechanical connection, such as a gear arrangement or a belt-pulley arrangement, can be used to connect the actuator 18 to the valve shaft 22. In some cases, the actuator 18 can be connected directly to the valve shaft 22.

Figure 4:
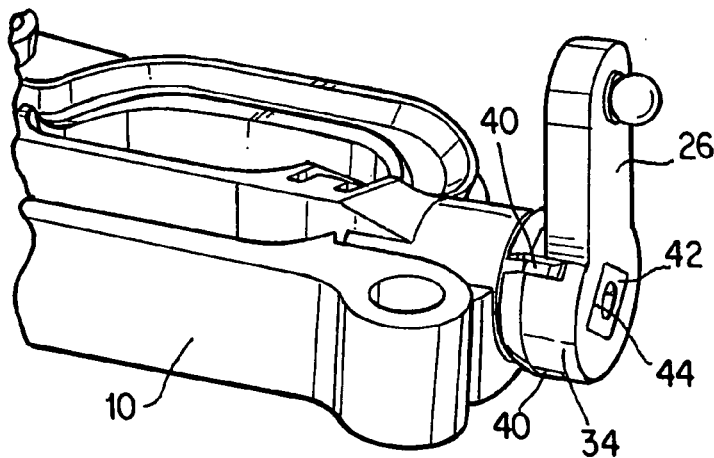
FIG. 4 is a perspective view of the snap connection of FIG. 3 in a connected state.

In the preferred embodiment shown in FIGS. 3 and 4, the snap connection 28 includes a cylindrical end 32 of the valve shaft 22 and a sleeve 34 on the follower crank 26. And the valve shaft end 32 includes a circular groove 36 on its outer surface, and the sleeve 34 includes a circular protrusion 38 on its inner surface. When the end 32 of the valve shaft 22 extends into the sleeve 34 as shown in FIG. 4, the circular protrusion 38 can snap into the circular groove 36 to secure the end 32 of the valve shaft 22 inside the sleeve 34.

In general, a cavity of any suitable configuration can be used in place of the sleeve 34, and a member that is configured to be extendable into the cavity can be used in place of the cylindrical end 32 of the valve shaft 22, to form a snap connection. Additionally, the cavity can be part of any one of the actuator 18 and the valve shaft 22, and the member can be part of the other of the actuator 18 and the valve shaft 22. Furthermore, the circular groove 36 can be replaced by an indentation of any suitable configuration, and a circular protrusion 38 can be replaced by any suitable protrusion that can engage the indentation.

In the illustrated embodiment, the circular protrusion 38 and circular groove 36 preferably are sufficiently flexible so that the circular protrusion 38 can be snapped into the circular groove 36 with relative ease. This can be accomplished either with an elastic material or with structural features. In the preferred embodiment, it is accomplished with both. In terms of material the sleeve 34 is molded from a relatively elastic plastic material, and in terms of structural features the sleeve 34 includes four axial grooves 40 intersecting the circular protrusion 38. When the circular protrusion 38 is being snapped into the circular groove 36, the circular protrusion 38 expands radially outward to accommodate the shaft end 32 before it is snapped into the circular groove 36. Additionally and alternatively, the shaft end 32 may be made from a similar material or have similar structural features to make the circular groove 36 more flexible.

Preferably, the airflow control valve assembly 14 includes a structural feature that rotationally connects the follower crank 26 and the valve shaft 22 to each other when they are snapped together. In the illustrated embodiment, as shown in FIGS. 3 and 4, the end 32 of the valve shaft 22 includes a square member 42, wherein the sleeve 34 includes a square indentation or hole 44, and wherein, when the cylindrical end 32 of the valve shaft 22 is snapped into the sleeve 34, the square member 42 engages the square indentation or opening 44 to rotationally connect the valve shaft 22 and actuator 18 to each other so that the follower crank 26 and the valve shaft 22 rotate together.

Figure 5:
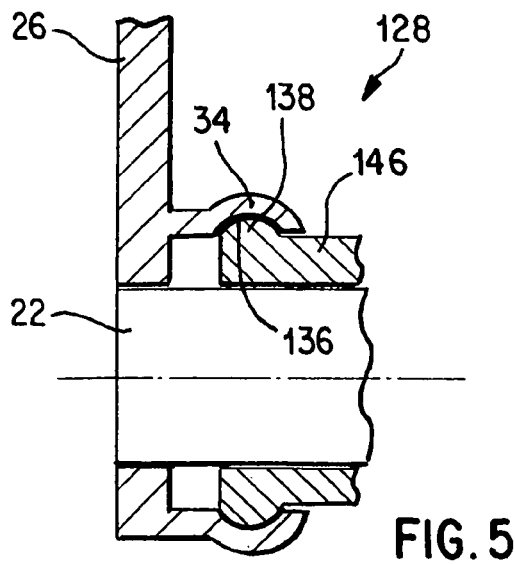
FIG. 5 is a cross-section view of another preferred snap connection in a connected state.

FIG. 5 illustrates a different snap connection 128 that is a part of another engine intake manifold 110 of the present invention. One of the differences between this engine intake manifold and the one shown in FIGS. 1-4 is how the actuator is mounted. In this embodiment, the actuator is mounted to the casing of the intake manifold via the snap connection 128.

As shown in FIG. 5 the snap connection 128 includes a sleeve 146 on the casing of the intake manifold and a sleeve 34 on the follower crank 26, wherein the valve shaft 22 is rotatably mounted in the casing sleeve 146 for support. The outer surface of the casing sleeve 146 has a circular protrusion 138, while the inner surface of the follower crank sleeve 34 has a circular groove 136. When the casing sleeve 146 extends into the follower crank sleeve 34, the circular protrusion 138 and the circular groove 136 engage with each other to form the snap connection 128.

Preferably, the circular protrusion 138 and the circular groove 136 are sufficiently flexible so that the circular groove 136 can be easily snapped into the circular protrusion 138. To that end, the follower crank sleeve 34 may have one or more of the axial grooves 40, shown in FIGS. 3 and 4, to increase the flexibility of the circular groove 136.

The invention claimed is:

1. An engine intake manifold, comprising:
   a casing including a plurality of air intake passages;
   a plurality of valve plates, wherein each valve plate is disposed in one of the air intake passages to control airflow through the one air intake passage;
   a valve shaft connected to the valve plates to rotate the valve plates between an open position and a closed position, wherein the valve shaft and plates are rotatably disposed in the casing;
   an actuator rotationally connected to the valve shaft to allow the actuator to rotate the valve shaft; and
   a snap connection that connects the actuator to the casing.

2. The intake manifold of claim 1, wherein the casing includes a sleeve in which the valve shaft is rotatably held, wherein the actuator includes a sleeve, wherein the snap connection includes the casing sleeve and the actuator sleeve, and wherein the casing sleeve is extendable into the actuator sleeve in the axial direction of the valve shaft.

3. The intake manifold of claim 2, wherein the outer surface of the casing sleeve includes one of an indentation and an protrusion, wherein the inner surface of the actuator sleeve includes the other of the indentation and the protrusion, and wherein when the casing sleeve extends into the actuator sleeve the indentation and the protrusion engage with each other to form the snap connection.

4. The intake manifold of claim 3, wherein the indentation is a circular groove and the protrusion is a circular protrusion, wherein the circular groove and the circular protrusion are configured so that, when they are engaged, they secure the casing sleeve inside the actuator sleeve.

5. The intake manifold of claim 4, wherein the circular protrusion and circular groove are sufficiently flexible so that the circular protrusion can be snapped into the circular groove.

6. The intake manifold of claim 5, wherein the actuator sleeve includes at least one axial groove intersecting both inner and outer surfaces of the actuator sleeve, and wherein the at least one axial groove intersects the circular protrusion or the circular groove on the actuator sleeve's inner surface to increase the flexibility of the circular protrusion or the circular groove on the actuator sleeve's inner surface.

7. The intake manifold of claim 2, wherein an end of the valve shaft includes a polygonal member, wherein the actuator sleeve includes a polygonal indentation, and wherein, when the end of the valve shaft extends into the actuator sleeve, the polygonal member engages the polygonal indentation to rotationally connect the valve shaft and actuator to each other so that the actuator can rotate the valve shaft.

8. The intake manifold of claim 1, wherein the actuator includes an actuator shaft and a four-bar linkage connecting the actuator shaft to the valve shaft, and wherein the four-bar linkage has a driving crank connected to the actuator shaft, a follower crank rotatably connected to the casing sleeve via the snap connection, and a coupler connecting the driving and follower cranks.

9. An airflow control valve assembly for an engine intake manifold, the valve assembly comprising:
   a plurality of valve plates;
   a valve shaft connected to the valve plates to rotate the valve plates between an open position and a closed position;
   an actuator; and
   a snap connection that connects the valve shaft to the actuator to allow the actuator to rotate the valve shaft.

10. The valve assembly of claim 9, wherein each valve plate is disposed in one of the engine intake manifold's air intake passages to control airflow through the one air intake passage.

11. The valve assembly of claim 9, wherein the snap connection includes a cavity, which is disposed at one of a valve shaft end and the actuator, and a member extendable into the cavity, which member is disposed at the other of the valve shaft end and actuator, wherein one of the cavity and member includes an indentation and the other of the cavity and member includes a protrusion, and wherein, when the member extends into the cavity, the protrusion can engage the indentation.

12. The valve assembly of claim 11, wherein the protrusion and indentation are configured so that, when they are engaged, they secure the member inside the cavity to form the snap connection.

13. The valve assembly of claim 12, wherein the protrusion and indentation are sufficiently flexible so that the protrusion can be snapped into the indentation.

14. The valve assembly of claim 9, wherein the snap connection locks the valve shaft to the actuator in the shaft's axial direction, and wherein the valve assembly further includes a locking mechanism that rotationally connect the valve shaft and actuator to each other so that the actuator can rotate the valve shaft.

15. The valve assembly of claim 11, wherein the member is cylindrical and is the valve shaft end, wherein the cavity is the hollow interior of a sleeve belonging to the actuator, and where the cylindrical valve shaft end is extendable into the sleeve in the axial direction of the valve shaft.

16. The valve assembly of claim 15, wherein the indentation includes a circular groove, and wherein the protrusion includes a circular protrusion.

17. The valve assembly of claim 16, wherein the circular protrusion and circular groove are configured so that, when they are engaged, they secure the cylindrical end of the valve shaft inside the sleeve to connect the valve shaft to the actuator to allow the actuator to rotate the valve shaft.

18. The valve assembly of claim 17, wherein the circular protrusion and circular groove are sufficiently flexible so that the circular protrusion can be snapped into the circular groove.

19. The valve assembly of claim 18, wherein the sleeve includes at least one axial groove intersecting both inner and outer surfaces of the sleeve, and wherein the at least one axial groove intersects the circular protrusion or the circular groove on the sleeve's inner surface to increase the flexibility of the circular protrusion or the circular groove on the sleeve's inner surface.

20. The valve assembly of claim 18, wherein the cylindrical end of the valve shaft is hollow and includes at least one axial groove intersecting both inner and outer surfaces of the hollow cylindrical end of the valve shaft, and wherein the axial groove intersects the circular protrusion or the circular groove on the hollow cylindrical end of the valve shaft to increase the flexibility of the circular protrusion or the circular groove on the hollow cylindrical end of the valve shaft.

21. The valve assembly of claim 15, wherein the end of the valve shaft includes a polygonal member, wherein the sleeve includes a polygonal indentation, and wherein, when the cylindrical end of the valve shaft is snapped into the sleeve, the polygonal member engages the polygonal indentation to rotationally connect the valve shaft and actuator to each other so that the actuator can rotate the valve shaft.

22. The valve assembly of claim 15, wherein the actuator includes an actuator shaft and a four-bar linkage connecting the actuator shaft to the valve shaft, and wherein the four-bar linkage has a driving crank connected to the actuator shaft, a follower crank rotationally connected to the valve shaft via the snap connection, and a coupler connecting the driving and follower cranks.

23. The valve assembly of claim 17, wherein the actuator includes an actuator shaft and a four-bar linkage connecting the actuator shaft to the valve shaft, and wherein the four-bar linkage has a driving crank connected to the actuator shaft, a follower crank rotationally connected to the valve shaft via the snap connection, and a coupler connecting the driving and follower cranks.

24. An engine intake manifold, comprising:
a plurality of air intake passages;
a plurality of valve plates, wherein each valve plate is disposed in one of the air intake passages to control airflow through the one air intake passage;
a valve shaft connected to the valve plates to rotate the valve plates between an open position and a closed position;
an actuator; and
a snap connection that connects the valve shaft to the actuator to allow the actuator to rotate the valve shaft.

25. The intake manifold of claim 24, wherein the snap connection includes a cylindrical end of the valve shaft and a sleeve belonging to the actuator, and where the cylindrical end of the valve shaft is extendable into the sleeve in the axial direction of the valve shaft.

26. The intake manifold of claim 25, wherein the indentation includes a circular groove, and wherein the protrusion includes a circular protrusion.

27. The intake manifold of claim 26, wherein the circular protrusion and circular groove are configured so that, when they are engaged, they secure the cylindrical end of the valve shaft inside the sleeve to connect the valve shaft to the actuator to allow the actuator to rotate the valve shaft.

28. The intake manifold of claim 27, wherein the circular protrusion and circular groove are sufficiently flexible so that the circular protrusion can be snapped into the circular groove.

29. The intake manifold of claim 28, wherein the sleeve includes at least one axial groove intersecting both inner and outer surfaces of the sleeve, and wherein the at least one axial groove intersects the circular protrusion or the circular groove on the sleeve's inner surface to increase the flexibility of the circular protrusion or the circular groove on the sleeve's inner surface.

30. The intake manifold of claim 28, wherein the cylindrical end of the valve shaft is hollow and includes at least one axial groove intersecting both inner and outer surfaces of the hollow cylindrical end of the valve shaft, and wherein the axial groove intersects the circular protrusion or the circular groove on the hollow cylindrical end of the valve shaft to increase the flexibility of the circular protrusion or the circular groove on the hollow cylindrical end of the valve shaft.

31. The intake manifold of claim 25, wherein the end of the valve shaft includes a polygonal member, wherein the sleeve includes a polygonal indentation, and wherein, when the cylindrical end of the valve shaft is snapped into the sleeve, the polygonal member engages the polygonal indentation to rotationally connect the valve shaft and actuator to each other so that the actuator can rotate the valve shaft.

32. The intake manifold of claim 25, wherein the actuator includes an actuator shaft and a four-bar linkage connecting the actuator shaft to the valve shaft, and wherein the four-bar linkage has a driving crank connected to the actuator shaft, a follower crank rotationally connected to the valve shaft via the snap connection, and a coupler connecting the driving and follower cranks.

33. The intake manifold of claim 24, wherein the actuator includes an actuator shaft and a four-bar linkage connecting the actuator shaft to the valve shaft, and wherein the four-bar linkage has a driving crank connected to the actuator shaft, a follower crank rotationally connected to the valve shaft via the snap connection, and a coupler connecting the driving and follower cranks.

* * * * *